UNITED STATES PATENT OFFICE.

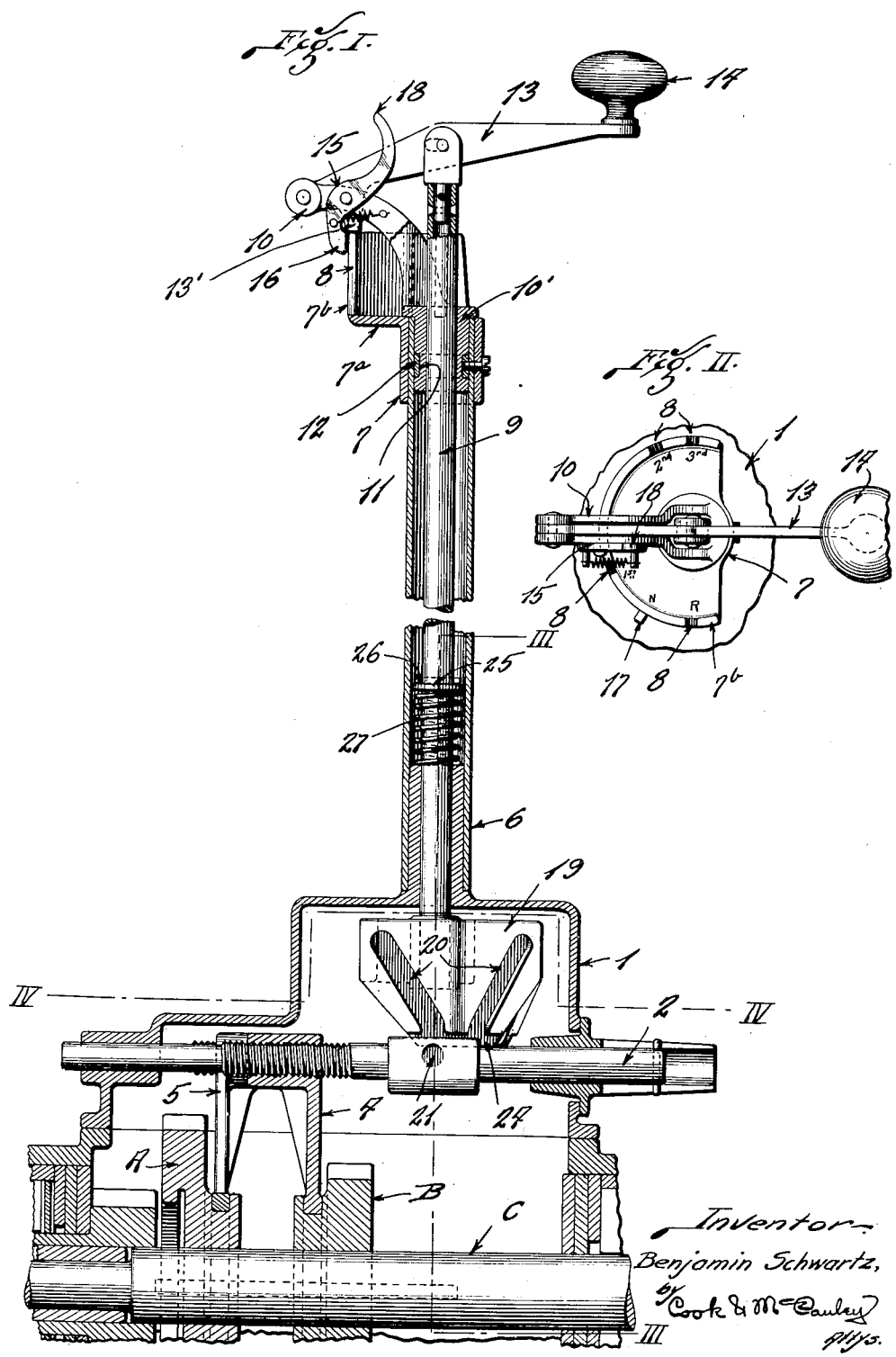

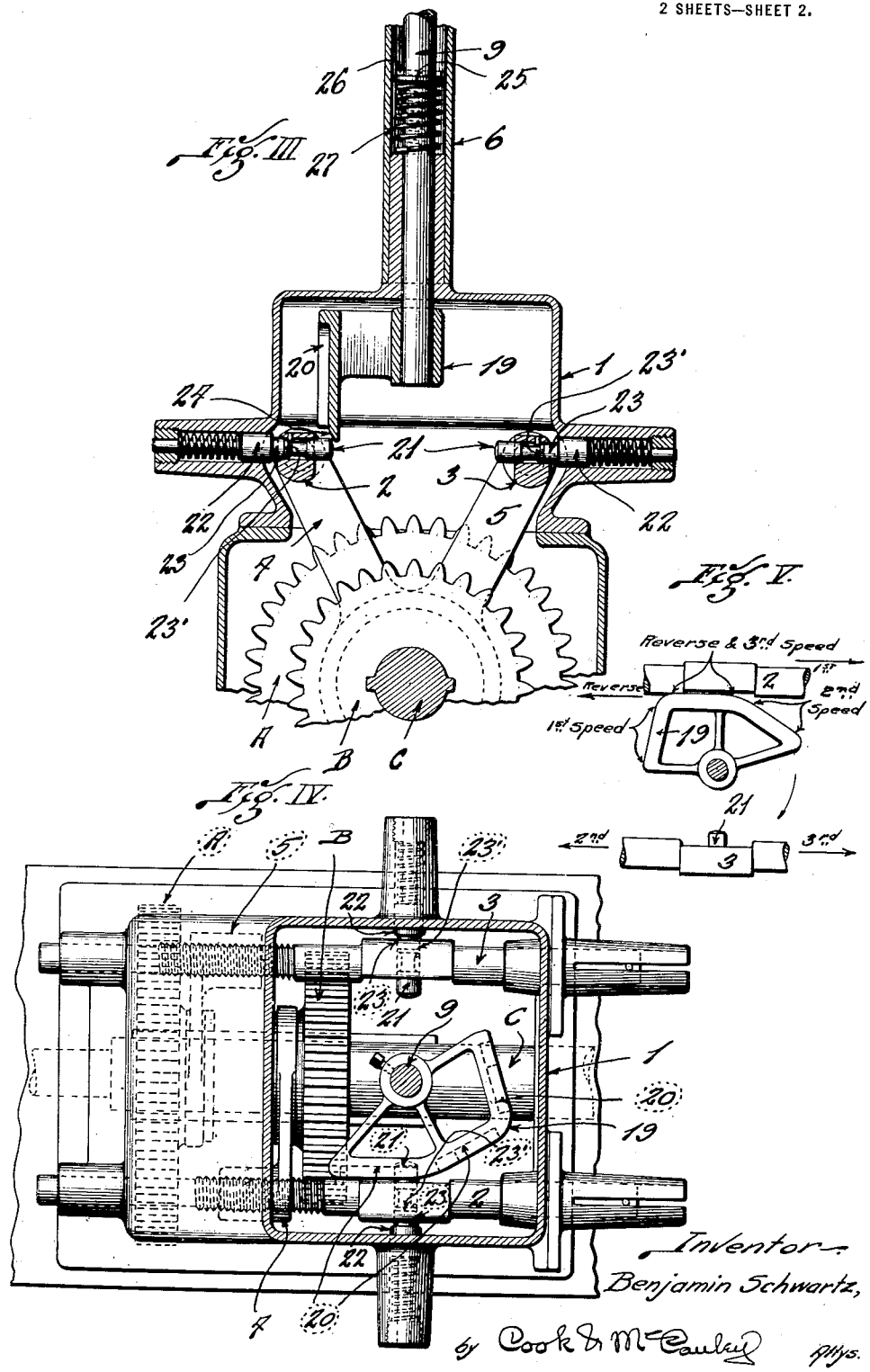

BENJAMIN SCHWARTZ, OF ST. LOUIS, MISSOURI.

CONTROLLER FOR SPEED-CHANGING MECHANISM.

1,370,609.  Specification of Letters Patent.  Patented Mar. 8, 1921.

Application filed January 28, 1920. Serial No. 354,714.

*To all whom it may concern:*

Be it known that I, BENJAMIN SCHWARTZ, a citizen of the United States of America, a resident of the city of St. Louis, in the State of Missouri, have invented certain new and useful Improvements in Controllers for Speed-Changing Mechanism, of which the following is a full, clear, and exact description, reference being had to the accompanying drawings, forming a part of this specification.

My invention relates to a controller adapted to operate the sliding gears, or the like, of speed changing mechanisms of motor vehicles, the invention having for its object the production of an improved controller having the same utility as the usual selectors and control levers heretofore used in conjunction with speed changing mechanisms to control the shifting of the sliding gears in changing from one speed to another, into neutral position or into reverse position. The use of the usual selectors and control levers in connection with speed changing mechanisms not infrequently results in mistakes on the part of the operator, and furthermore, the use of the selectors necessitates a variety of movements of the control levers in changing from one speed to another and the operation of the said control levers not infrequently results in damage to the transmission gears of motor vehicles, and in accidents occasioned by confusion in the operation of the control levers through the selectors.

By my invention I provide a controller very simple in nature and in the use of which mistakes are eliminated and the operations of shifting the gears are accomplished with great ease as distinguished from the irksomeness of the operation of the control levers and selectors heretofore used.

Figure I is a vertical section through my controller.

Fig. II is a fragmentary plan view of the operating means of my controller.

Fig. III is a section on line III—III of Fig. I.

Fig. IV is a section on line IV—IV of Fig. I.

Fig. V is a diagrammatic view showing the position of the selector for the different speeds and for reverse operation.

In the drawings I have shown only so much of a speed changing mechanism as my controller is directly associated with, viz., the sliding gears movable to and from other gears of said mechanism as usual, and the shaft carrying these sliding gears and on which they are shifted. The sliding gears are designated by the letters A and B and the shaft by the letter C (see Fig. I).

Referring now to my controller 1 designates a housing or support located in proximity to and over the shaft C and the sliding gears thereon. Rods 2 and 3 slidably mounted in the housing 1 and arranged parallel with the shaft C, are provided with shifters 4 and 5 said shifters respectively engaging collars extending from the sliding gears A and B. The shifters 4 and 5 together with the rods 2 and 3 to which they are secured are adapted to be reciprocated within the housing 1 to move the sliding gears into and out of mesh with the gears they are intended to coöperate with, as usual in a speed changing transmission mechanism. 6 designates a tubular column supported by the housing or support 1 and upon which is mounted a stop device 7 comprising a base $7^a$ and an upwardly extending arcuate flange $7^b$, having formed therein at different points vertical slots 8. The slots 8 formed in the flange $7^b$ indicate the various positions to which the speed changing sliding gears A and B may be shifted, including the positions in which said gears provide for different speeds in the operation of transmission mechanism, for reverse motion of the transmission mechanism, and for neutral position in which the gears are inactive.

9 designates a rotatable shaft extending through the hollow column 6, the lower end of said shaft terminating in proximity to the rods 2 and 3 and the upper end of the shaft terminating above the stop device 7. A bracket 10, having a circular lower portion 10′ interposed between the tubular column 6 and the shaft 9, is adapted to rotate within the tubular column 6. To permit this rotation, the lower portion 10′ of the bracket 10 is provided with an annular groove 11 which is adapted to receive a split ring 12 secured in any suitable manner to the tubular column 6. In Fig. I of the drawing a screw is shown passing through the base of the stop member 7, the tubular column 6 and into the split ring 12 thereby securing these nonrotating elements together.

Pivotally connected to the bracket 10 and secured to the shaft 9 by means of a slot and pin connection is a hand lever 13 which is adapted to be moved in an arc of a circle over the top face of the upturned arcuate flange 7ᵇ of the stop member 7 in which is formed the hereinbefore mentioned slots 8. Said hand lever is provided with an extension 13′ which is adapted to enter the said slots 8 when the lever is depressed. A handle 14 is carried by said hand lever by which it may be operated. The bracket 10 has mounted on it a spring controlled stop arm 15 provided with a down turned finger 16, adapted to strike a stop 17 on the stop member 7 when the hand lever and bracket are moved thereto. A finger piece 18 carried by the stop arm 15 permits of the operator readily lifting said stop arm so that the finger will pass beyond the stop 17 when shifting the hand lever to the slot 8 (Fig. II) bearing the character "R" (reverse).

I come now to the description of the means operable by the shaft 9 when the hand lever 13 is operated, and by which the shifters 4 and 5 are actuated to move the sliding gears A and B of the speed changing mechanism into selected positions corresponding to the characters upon the stop member 7. This means consists of a selector 19 fixed to the lower end of the shaft 9 having a series of flat faces, each of which is provided with a cam groove 20. Set into circular openings formed in the rods 2 and 3 in which they are adapted to be moved to and fro, are pins 21 which are adapted to be engaged by the walls of cam grooves 20 of the selector. By referring to Figs. I and III it will be understood that if the selector 19 was moved downwardly the inclined sides of the groove 20 would force the pin 21 and the rod by which it is carried laterally, and because the said rod also carried a gear shifter one of the speed changing gears would be shifted.

To lock the speed changing gears in the neutral positions, I provide a pair of locking devices each comprising a spring pressed plunger 22 having a reduced end 23 adapted to enter the circular opening formed in one of the rods 2 or 3. The outer face 23′ of the reduced end 23 abuts the inner end of a pin 21. It is apparent that while the reduced end 23 of the plunger 22 is seated in the opening formed in the rod, the said rod cannot be moved laterally and the danger of the gears A and B being accidentally shifted due to the jar of the vehicle or for any other reason is eliminated. To provide a means for unlocking the rods 2 and 3 when it is desired to shift the gears A and B I provide the lower edge of the selector 19 with an inclined face 24, the function of which is to force the pins 21 against the reduced ends of the spring pressed plungers in the rods 2 and 3 when the selector 19 is moved downwardly. This action, because the said pins 21 bear against the said reduced end 23 of the spring pressed plunger 22, will force the said reduced end from the circular opening in the selected rod, thereby permitting the said rod to be moved longitudinally by the action of the inclined faces of the grooves 20 acting upon the said pins 21.

To afford an understanding of the action of the selector 19 in shifting the sliding gears A and B, it will be assumed that the operator desires to start his vehicle moving at 1st or low speed, he moves the hand lever 13 from the neutral position marked "N" in Fig. II to a point where the said hand lever is immediately over the slot 8 in the stop member 7 marked "1st," this will bring the proper slot 20 in the selector over the pin 21 on one of the shifter rods. The hand lever will then be depressed which will cause the extension 13′ on the hand lever 13 to enter the slot 8 in the stop member 7. The initial downward movement given the selector will cause the inclined lower edge of the said selector to force the locking element 23, through the medium of the pin 21, from the opening formed in the shifter rod, thereby releasing said shifter rod, and a continuation of the downward movement of said selector will cause the pin 21 to be engaged by an inclined wall of the groove 20 and the shifting will be accomplished in a manner hereinbefore described. If now the operator desires to shift to a higher speed he has only to raise the hand lever to an approximately horizontal position, thereby disengaging the gears that have been in mesh and the extension 13′ on the hand lever will then be free of the slot 8. The hand lever can then be moved to the next slot 8 where the operations just described will be repeated.

It will be noted that the stop member 7 will prevent operation of the device when the parts are in an inoperative position, as the extension 13′ on the hand lever 13 will strike the upper edge of the arcuate flange 7ᵇ and prevent the said hand lever being depressed. It is only when the hand lever is brought to a position over one of the slots 8 in the stop member 7, at which time the parts are in an operative position that the hand lever can be depressed.

To effect reverse operation of the transmission mechanism, the hand lever 13 is moved toward the slot marked "R" in Fig. II, and this movement will bring the proper slot in the selector over the pin 21 on one of the shifter rods. To obtain this position the stop arm 15 on the bracket 10 is actuated so that its finger will pass beyond the stop 17 (Fig. II) on the stop member 7 which is provided to prevent accidental movement of the hand lever past the neutral position and to the reversing position.

It will be noted that while the selector 19 is shown as having but three grooves (Fig. IV), four speeds are possible, the reason for this being that the same groove is used for 3rd or high speed and the reverse position. These two positions are obtained, however, by the operation of opposite shifter rods 2 and 3.

To prevent the extension 13' on the hand lever 13 from dragging too heavily along the upper face of the stop member 7 and catching in the slots therein when said lever is being operated horizontally I provide a washer 25 surrounding the shaft 9 and bearing against a pin 26 which passes through the said shaft, and a coil spring 27 is interposed between the washer and the upper extension of the housing 1. This spring will have only sufficient strength to hold the parts in an elevated position and will not have the necessary strength to draw the shaft 9 upwardly when it is in a depressed position.

I claim:

1. The combination with sliding gears of a speed changing mechanism, of a controller for said gears comprising gear shifters, a rotary selector having cams for the operation of the respective gear shifters, said selector being adjustable about its axis to select the gear shifter to be operated and said selector being shiftable in another direction to shift the selected gear shifter, and an operating handle whereby said selector is adjusted and shifted to select and shift the gear shifter.

2. The combination with sliding gears of a speed changing mechanism, of a controller for said gears comprising gear shifters, a rotatable selector movable in a line parallel with its axis of rotation, said selector being provided with cam grooves for the operation of said shifters and means for operating said selector.

3. The combination with sliding gears of a speed changing mechanism, of a controller for said gears comprising gear shifters, a rotatable selector movable in a line parallel with its axis of rotation, said selector being provided with cams and an operating shaft for the operation of said shifters, and a hand lever for operating said shaft.

4. The combination with sliding gears of a speed changing mechanism, of a controller for said gears comprising gear shifters, a rotatable selector movable in a line parallel with its axis of rotation, said selector being provided with cams for the operation of said shifters, a shaft for imparting rotary movement and a movement in a line parallel with its axis of rotation to said selector, an operating lever on said shaft, said operating lever being movable to impart a movement to said shaft in a line parallel to its axis of rotation when the selector occupies its operative positions, and a stop whereby the last mentioned movement is prevented when the selector occupies an inoperative position.

5. The combination with sliding gears of a speed changing mechanism, of a controller for said gears comprising gear shifters, a rotatable selector movable in a line parallel with its axis of rotation, said selector being provided with cams for the operation of said shifters, a shaft for imparting rotary movement and a movement in a line parallel with its axis of rotation to said selector, an operating lever for said shaft, said operating lever being movable to impart movement in a line parallel to said axis of rotation to said shaft and selector, and a stop to prevent the last mentioned movement when the selector is in an inoperative position, said stop being provided with recesses to permit said movement when the said selector occupies an operative position.

6. The combination with sliding gears of a speed changing mechanism, of a controller for said gears, comprising sliding shifter rods, shifters mounted upon said rods, a rotatable selector movable in a line parallel with its axis of rotation, said selector being provided with cams for operating said shifters, a locking device for locking the said shifter rods in a certain position, and means carried by said selector whereby said locking device may be unlocked to shift said shifter rods.

In testimony that I claim the foregoing I hereunto affix my signature.

BENJAMIN SCHWARTZ.